United States Patent [19]

Gold

[11] 4,080,196

[45] Mar. 21, 1978

[54] METHOD OF OPERATING A VERTICAL SHAFT FURNACE

[76] Inventor: Louis Gold, 2725 39th St., NW., Washington, D.C. 20007

[21] Appl. No.: 686,986

[22] Filed: May 17, 1976

Related U.S. Application Data

[63] Continuation-in-part of Ser. No. 602,501, Aug. 5, 1975, abandoned.

[51] Int. Cl.$^2$ .............................................. C21B 5/06
[52] U.S. Cl. .......................................... 75/42; 48/210
[58] Field of Search ........................ 75/41, 42; 48/210

[56] References Cited

U.S. PATENT DOCUMENTS

| | | | |
|---|---|---|---|
| 1,924,842 | 8/1933 | Ebner | 75/41 UX |
| 2,337,551 | 12/1943 | Hansgirg | 75/41 |
| 3,630,719 | 12/1971 | Craig | 75/41 |

OTHER PUBLICATIONS

U.S. Steel *Making Shaping & Treating of Steel* 1957, pp. 253–256.

*Primary Examiner*—M. J. Andrews
*Attorney, Agent, or Firm*—Sughrue, Rothwell, Mion, Zinn and Macpeak

[57] ABSTRACT

In a vertical shaft furnace such as a blast furnace where the charge is introduced at the top of the furnace to form a burden which moves downwardly through the furnace to the combustion zone adjacent the tuyeres, the top of the furnace is provided with a sealing arrangement to prevent the escape of effluent gases and the exhaust conduits are disposed through the side of the furnace at an intermediate level between the combustion zone and the top of the burden.

2 Claims, 8 Drawing Figures

METHOD OF OPERATING A VERTICAL SHAFT FURNACE

CROSS-REFERENCE TO RELATED APPLICATIONS

This application is a Continuation-In-Part of application Ser. No. 602,501, filed Aug. 5, 1975 and entitled "Vertical Shaft Furnace" now abandoned.

BACKGROUND OF THE INVENTION

1. Field of the Invention

The present invention is directed to vertical shaft furnaces and more specifically to a top sealed vertical shaft furnace.

2. Prior Art

In conventional vertical shaft furnaces of the type used for smelting ores the top of the furnace is customarily provided with hopper means for introducing the charge into the furnace to form the burden which moves downwardly through the furnace to the combustion zone adjacent a plurality of circumferentially located tuyeres through which an air blast is introduced. The combustion gases rise upwardly through the furnace and collect in the top space between the top of the burden and the hopper means. An exhaust conduit or "downcomer" is provided in this top space for the removal of the gaseous effluents.

An example of such a furnace is the well known blast furnace used for the production of pig iron. The blast furnace is charged with a suitable mixture of coke, limestone and iron ore. The blast furnace process is based upon the counterflow of gases and solids. As carbon monoxide, nitrogen and hydrogen flow upward from the combustion zones, oxygen is acquired from the descending charge. In the reduction of iron ore, a portion of the carbon monoxide is converted to carbon dioxide and similarly a portion of the hydrogen is converted to water vapor. The inert nitrogen from the air used in combustion passes through the furnace with little change. Its concentration is, however, decreased by reactions such as direct reduction and solution loss which increase the volume of carbon monoxide in the gas stream. Similarly, the evolution of carbon dioxide from the limestone also dilutes the nitrogen. All of the gases and vapors produced collect at the top of the furnace and are removed through the "downcomer".

The Ebner U.S. Pat. No. 1,924,842 broadly discloses the idea of locating the outlet conduits immediately below the stock line to prevent the entry of dust or other particulate matter present in the air space above the stock line into the outlet conduits.

SUMMARY OF THE INVENTION

The present invention provides an innovative means to improve the practice of gasification whereby the conventional removal of gases produced in a smelting type furnace, such as the blast furnace, proceeding upwardly through the burden, through the top space and outwardly through the "downcomer" is replaced by a properly arranged conduit at a predetermined level above the tuyeres but below the top of the burden. Thus, the top of the furnace is sealed peripherally and the customary "downcomer" is absent. Suitable sealing means are provided by the feed lock or double bell charging structure at the top of the furnace. The present invention provides for a unique flow of gaseous effluents in a vertical shaft furnace wherein the conventional top gas is forced back downwardly through the burden to the outlet pipes or conduits located at an intermediate level between the top of the burden and the combustion zone. Consequently, pyrolytic products resulting from the thermal decomposition of feed stock together with moisture driven off as steam are made to react with the hot charge. The net result is to suppress the presence of water and tarry matter in the effluent gas to provide a dry clean gaseous product.

The foregoing and other objects, features and advantages of the invention will be apparent from the following more particular description of a preferred embodiment of the invention as illustrated in the accompanying drawings.

DETAILED DESCRIPTION OF THE PREFERRED EMBODIMENTS

Although the top sealed vertical shaft furnace according to the present invention could vary greatly depending on the specific purpose for which the furnace was designed a blast furnace for the production of pig iron will be discussed by way of example.

Figure 1:
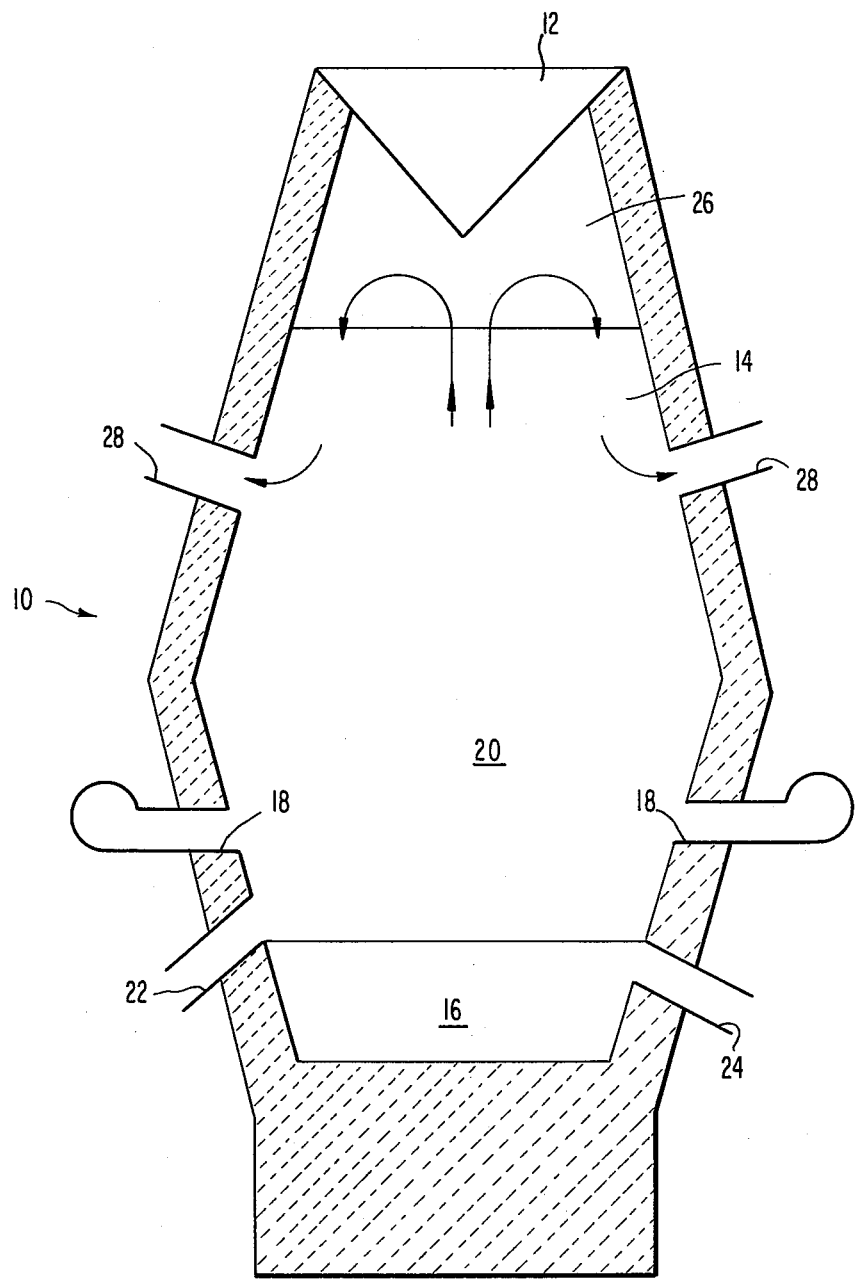
FIG. 1 is a schematic cross-sectional view of a vertical shaft furnace incorporating the present invention therein.

The blast furnace 10 as shown in FIG. 1 is provided with the conventional feed means 12 for introducing the charge of coke, limestone and iron ore in predetermined quantities into the furnace. Such a conventional feed means is generally provided with sealing means so that when the feed means is closed the escape of gas through the feed means will be prevented. The material charged into the furnace forms the burden 14 which is supported in the conventional manner on a coke bed 16. A plurality of tuyeres 18 are circumferentially spaced about the circumference of the furnace to provide for the introduction of a hot air blast into the combustion zone generally indicated at 20. As the molten material settles to the bottom of the furnace the slag is removed through the outlet 22 and the molten pig iron is removed through the outlet 24.

Since the blast furnace process is based upon the counterflow of gases and solids the gases move upwardly through the burden or charge 14 as the burden moves downwardly through the vertical shaft furnace. In a conventional blast furnace the rising gases collect in the top space 26 and are removed through a conduit or "downcomer" which communicates with this top space 26. However, according to the present invention there are no conduits whatsoever communicating with the top space 26 for the removal of effluent gases. The sole means for removing the effluent gases are comprised of one or more conduits 28 extending through the wall of the furnace at an intermediate level intermediate the top of the burden 14 and the combustion zone 20 at a predetermined location. Thus, the effluent gases which collect in the top space 26 are forced back downwardly through the burden to the exhaust conduits 28 to provide a flow of gases as indicated generally by the arrows in the drawing. Consequently, the pyrolytic products resulting from the thermal decomposition of the feed stock together with the moisture driven off as steam are made to react with the hot charge. The net result is to suppress the presence of water and tarry matter in the effluent gas thereby providing a clean dry gaseous product.

Furthermore, the established downward mode of circulation of the volatiles favors the purging of other impurities as well as mixing with the fluxing agent. To ensure this, the effluent duct needs to be located at a depth below the top of the burden where the temperature ranges above 600° C. An ultimum location for the exhaust pipes can be determined experimentally to provide the optimum results.

The invention has particular value for the gasification of coal and/or refuse in vertical shaft furnaces without the smelting of ores. In vertical shaft furnaces where refuse is incinerated great quantities of water must be removed from the gaseous effluent. The altered flow configuration will force the steam back downwardly through the burden and depending upon the addition of other substances to the refuse such as coal, iron and aluminum the steam will react to generate carbon monoxide and hydrogen. A concomitant action is to eliminate fine dust particles, especially soot via the water-gas reaction.

Figure 2:
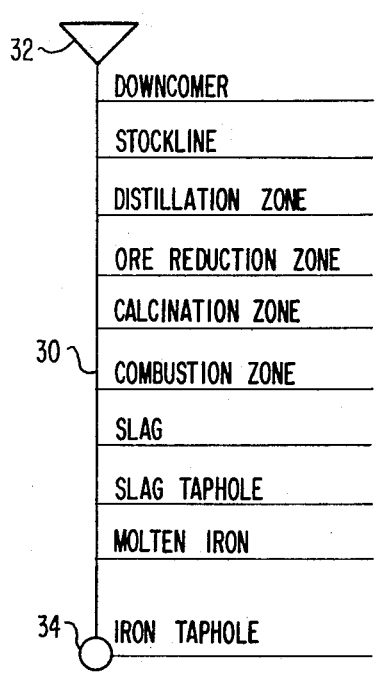
FIG. 2 is a schematic outline showing the relative locations of the various openings and levels within a conventional blast furnace.

FIG. 2 shows a relative position of the various openings and levels within a conventional blast furnace represented by the vertical line 30. A feed hopper or double valve 32 is provided at the top of the furnace for introducing the charge into the furnace and the lowest opening in the furnace is the tap hole 34 for removing the molten iron. Conventional blast furnaces are provided with a downcomer or outlet pipe for the blast furnace gases which accumulate in the space above the stock line. As a result of this location of the outlet pipe all of the distillation products such as steam and tarry matter as well as dust and other particulate matter will be entrained in the blast furnace gases.

Figure 3:
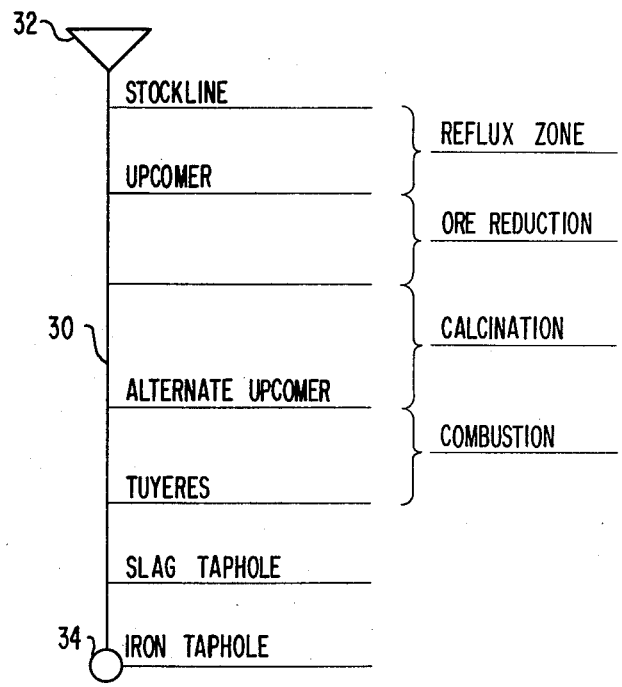
FIG. 3 is a schematic outline showing the relative locations of the various openings and levels within a blast furnace according to the present invention.

By locating the upcomer in either or both of the locations noted in the schematic outline of FIG. 3 not only will the dust be eliminated from the blast furnace gases as recognized by the prior art but a substantial change in the chemistry of the blast furnace will take place depending upon the location of the upcomer. By locating the upcomer adjacent the top of the ore reduction zone the gases which accumulate at the top of the furnace above the stock line will be forced back downwardly through the upper portions of the burden in an area identified as the reflux zone. Thus, all of the pyrolytic products in the gases will be either cracked or reformed and the steam will react with the hot coke to provide CO and $H_2$ to enhance the fuel value of the blast furnace gases. If the upcomer is located at the lower location as indicated in FIG. 3 between the combustion zone and the calcination zone all of the impurities from the pyrolysis of coal will be slagged as they pass downwardly through the calcination zone. Once again, the steam will react with the hot fuel bed and/or coal volatiles to provide additional CO and $H_2$. Also, since the upcomer in this location would be immediately above the combustion zone the CO from the combustion would be taken off directly before being converted to $CO_2$ so that the blast furnace gases taken off at this level would have a relatively high percentage of CO. With the reduced amount of CO rising to the furnace the ore reduction is reduced above the calcination zone and a higher percentage of the ore is subjected to direct reduction at a lower level in the furnace. With the upcomer located above the ore reduction zone the reduction of the ore by CO will be increased in the ore reduction zone.

Since the presence of steam and the distillation products are no longer any problem due to the location of the upcomer according to the present invention relatively inexpensive coal can be substituted for the expensive coke. In addition to reducing iron ore the system according to the present invention is also suitable for the reduction of lead and copper ores.

Figure 4:
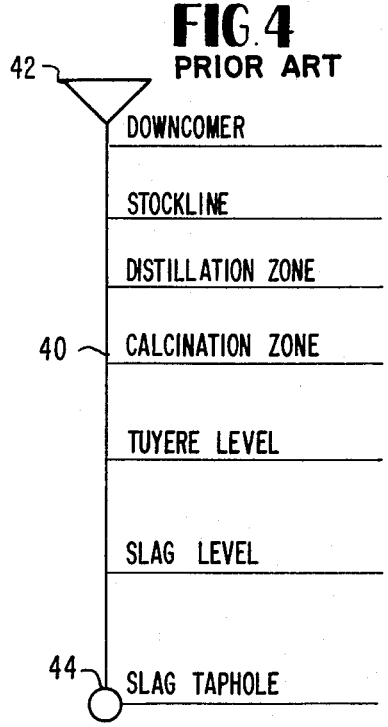
FIG. 4 is a schematic outline showing the relative locations of the openings and levels in a prior coal reactor construction.
Figure 5:
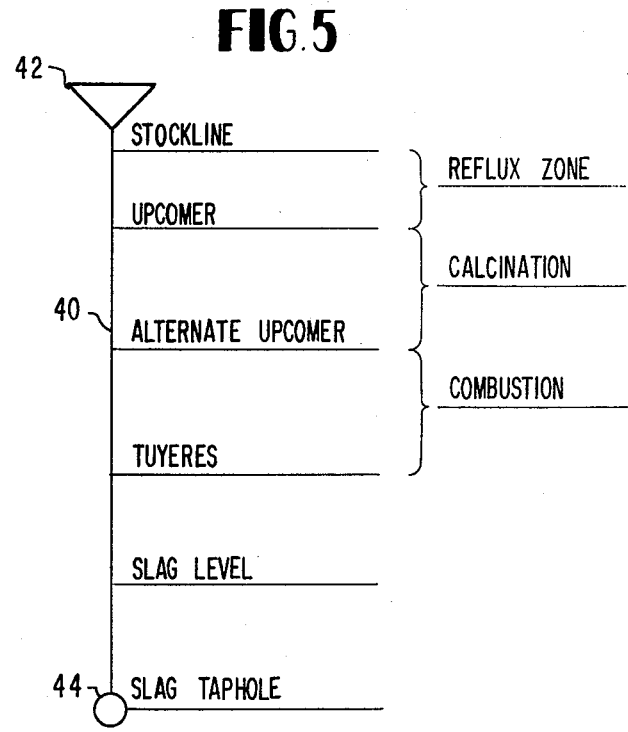
FIG. 5 is a schematic outline showing the relationship of the various openings and levels in a coal reactor as modified according to the present invention.

The schematic arrangement of the openings and levels within a coal reactor of the type disclosed in applicant's co-pending application Ser. No. 572,769, filed Apr. 29, 1975 is set forth in FIG. 4. As with the conventional blast furnace, the coal reactor is provided with a downcomer communicating with the space between the stock line and the hopper 42 of the vertical shaft indicated by the line 40. Since no ore is present in the coal reactor only a single tap hole 44 is provided at the bottom for the removal of slag. According to the present invention an upcomer can be located beneath the stock line substantially at the boundary between the calcination zone and the reflux zone, the latter being defined as the portion of the burden between the stock line and the upcomer. The upcomer can also be located at a lower level than the furnace between the combustion zone and calcination zones. As with the blast furnace furnace operation described above the distillation products from the coal as well as the steam which accumulate in the space above the stock line will be forced back downwardly through the reflux zone. The steam will be converted to CO and $H_2$ while the pyrolytic products will be either cracked or reformed. The burden will go through a purification process as it passes downwardly through the vertical shaft furnace before reaching the combustion zone. With the upcomer located above the calcination zone the furnace gases taken off through the upcomer will include a small amount of $CO_2$ resulting from the decomposition of the limestone flux. With the upcomer located between the calcination zone and the combustion zone the impurities from the pyrolysis of coal will be slagged on passage through the calcination zone. Some CO from the combustion zone will be taken off directly through the upcomer at this lower location. Thus, according to the present invention the composition of the gases can be varied by varying the location of the upcomer at different levels of the furnace below the stock line.

The temperature distribution within the vertical shaft furnace can also be modified by the location and number of the upcomers located below the stock line.

Figure 6:
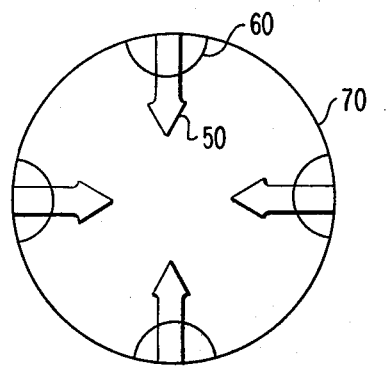
FIG. 6 is a schematic top plan view of a vertical shaft furnace according to the present invention with the tuyeres and upcomers being of equal number and disposed in vertical alignment.
Figure 7:
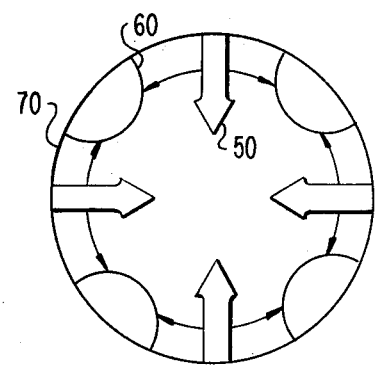
FIG. 7 is a schematic top plan view of a vertical shaft furnace according to the present invention wherein the tuyeres and upcomers are equal in number but circumferentially offset from each other.
Figure 8:
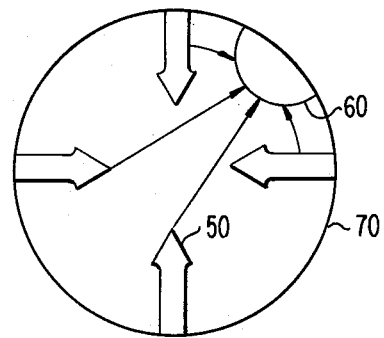
FIG. 8 is a schematic top plan view of a vertical shaft furnace according to the present invention wherein a plurality of equally spaced tuyeres are provided but only a single upcomer is provided.

FIGS. 6, 7 and 8 show three arrangements of the tuyeres 50 relative to the upcomers 60 about the circumference of a vertical shaft furnace 70. In FIG. 6 the four equally spaced upcomers 60 are located directly above the four equally spaced tuyeres 50 in a symmetric alignment. In the arrangement of FIG. 7 four equally spaced upcomers 60 are circumferentially offset from the four equally spaced tuyeres 50 to provide an anti-symmetric alignment. In FIG. 8 a single upcomer 60 is circumferentially located between two of four equally spaced tuyeres to provide an asymmetric alignment. While the gas flow is directly upward from the tuyeres to the upcomers in FIG. 6 the flow patterns of the gases are shown according to the arrows in FIGS. 7 and 8.

While the invention has been particularly shown and described with reference to a preferred embodiment thereof it will be understood by those in the art that various changes in form and details may be made therein without departing from the spirit and scope of the invention.

What is claimed is:

1. A method of operating a vertical shaft furnace to increase the CO and $H_2$ content of the furnace gases taken off comprising introducing a feed stock including coal products into the top of the furnace, blowing streams of gas into the furnace at the combustion zone level at spaced apart locations to promote combustion, sealing off the top portion of the furnace above the stock line, redirecting the gaseous streams, including steam, which rise to the top of the furnace downwardly through a reflux zone in the upper portion of the stock to at least a level below the top of the stock having temperatures at least about 600° C to react the steam with the hot stock to produce additional CO and $H_2$ and removing the furnace gases at said level through at least one conduit in the wall of the furnace.

2. The method as set forth in claim 1 further comprising recombining the distillation products present at the top of the furnace with the stock as the top gases are passed downwardly through said reflux zone to said conduit.

* * * * *